310-12 SR

FIP8502 XR 4,278,904

United States Patent [19]

Seilly

[11] 4,278,904

[45] Jul. 14, 1981

[54] ELECTROMAGNETIC DEVICES

[75] Inventor: Alec H. Seilly, North Wembley, England

[73] Assignee: Lucas Industries Limited, Birmingham, England

[21] Appl. No.: 139,145

[22] Filed: Apr. 10, 1980

[30] Foreign Application Priority Data

Apr. 11, 1979 [GB] United Kingdom ............... 12797/79

[51] Int. Cl.³ ............................................ H02K 33/00

[52] U.S. Cl. ........................................ 310/27; 310/12; 335/220

[58] Field of Search .................... 335/220; 310/12-14, 310/27

[56] References Cited

U.S. PATENT DOCUMENTS 3,353,040 11/1967 Abbott .................................. 310/27

4,090,097 5/1978 Seilly ...................................... 310/27

4,123,691 10/1971 Seilly ................................ 310/27 X 4,145,625 3/1979 Seilly .............................. 335/220 X

*Primary Examiner*—Donovan F. Duggan

[57] ABSTRACT

An electromagnetic device comprises an inner member having a pair of helical ribs on its peripheral surface, and windings whereby the ribs can be polarized so that the ribs assume opposite magnetic polarity. An outer member formed from magnetic material surrounds the inner member in spaced relationship and a further member is located in the annular space between the inner and outer members. The inner member comprises a pair of helical elements which when current flows through the windings are attracted to the ribs. The helical elements each have the characteristic of a spring and can deform to provide a progressive increase in the force available at one end of the further member.

6 Claims, 2 Drawing Figures

ELECTROMAGNETIC DEVICES

This invention relates to an electromagnetic device comprising a first member of annular form, a second member located within said first member and having two or a multiple of two axially spaced helical ribs defined on its surface presented to the first member, windings carried by said second member and which when supplied with electric current cause adjacent ribs to assume opposite magnetic polarity, said first member when the windings are energised, moving axially relative to said second member to reduce the reluctance of magnetic circuits defined by the two members.

Figure 1:
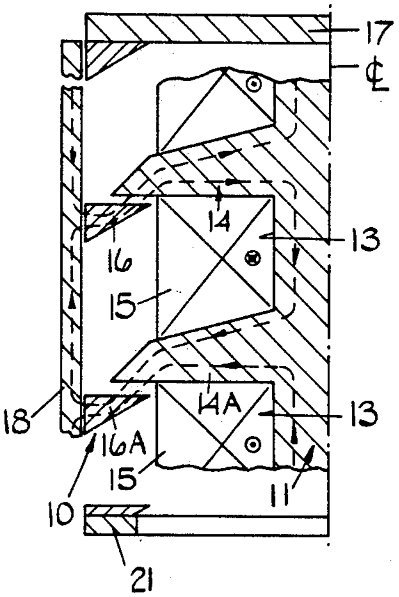
Figure 2:
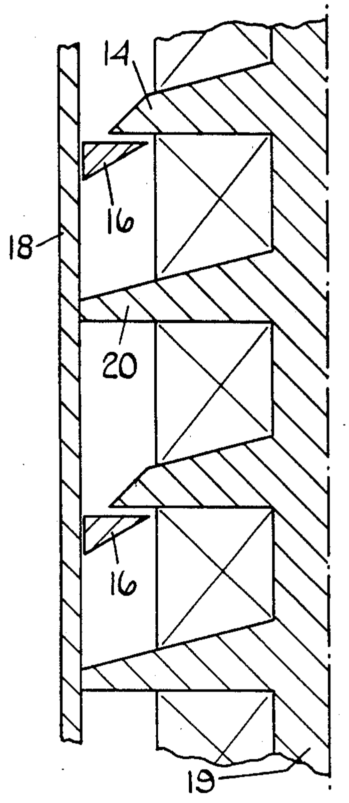

An example of an electromagnetic device as outlined above is disclosed in the specification of British Pat. No. 1504873. In this specification FIGS. 1 and 2 show that the aforesaid first and second members define pairs of helical ribs respectively with the ribs on the first member being defined by grooves formed on the internal surface of the annular member. The portions of the first member lying between the ribs serve to rigidly connect the ribs as well as serving to provide return paths for the magnetic flux.

The initial force which can be developed between the first and second members and which may be for example, utilised to operate a fluid control valve, is determined by the air gaps between the ribs of the members. If for a given initial air gap it is required to increase the force then the value of the current flowing in the windings must be increased in order to increase the magnetic flux. Alternatively, for a given value of the current, the air gaps must be reduced. In the latter case a given device may not provide sufficient movement and in the former case it may not be possible to increase the value of the current because of the possibility of damage to the windings.

The object of the present invention is to provide a device of the kind specified in a simple and convenient form.

According to the invention a device of the kind specified comprises a third member of annular form surrounding said first member, said third member being formed from magnetic material and defining a cylindrical surface presented to said first member, said first member comprising a helical element having an outer face presented to but spaced from the cylindrical surface of said third member and a face presented to a face of a rib of the second member, said helical element having the characteristic of a coiled spring, whereby when the windings are energised, deformation of the helical element can take place, thereby progressively increasing the force available at one end of the member.

With the proposed arrangement a progressive increase in the force available at one end of the first member occurs as the windings are energised.

Examples of devices in accordance with the invention will now be described with reference to the accompanying drawings, both of which show sectional side elevations through part of the device.

Referring to FIG. 1 of the drawings there is provided a first member 10 which is of annular form, the construction of which will be described hereinafter. A second member 11 is provided and this is of elongated form and is formed from magnetic material. The member 11 defines in the example, a pair of helical ribs 14, **14*a*. The ribs are defined by a pair of grooves 13 formed in the external surface of the member, the grooves being of helical form. Located in the grooves are windings 15** respectively and conveniently the windings are formed by winding a wire along one groove from one end of the member towards the other end of the member and returning to the one end of the member along the other groove. This process may be repeated a number of times so that the desired number of turns are assigned to the windings.

When the windings are energised the direction of current flow in the windings in each groove is in the opposite direction so that the ribs 14, **14*a* assume opposite magnetic polarity. The direction of current flow in the windings is indicated in FIG. 1** by the dot and cross.

The member 10 comprises a pair of helical elements 16, **16*a*. The elements are mounted on a plate 17 which is axially movable relative to the member 11 and which constitutes the output member of the device. The helical elements 16 are formed from magnetic material and have the characteristics of a coiled spring. The helical elements 16 are inter-engaged and have a generally triangular cross-section. One surface of the element 16 is presented to a radially extending surface of the rib 14 and a similar surface on the element 16*a* is presented to a similar surface on the rib 14*a*. In the de-energised condition of the windings, the elements 16 and 16*a* are spaced from the ribs 14, 14*a*** as shown in the drawings throughout their length.

Also provided is a third member which is referenced 18 and which is formed from magnetic material and is of annular form. Its internal surface is of plain cylindrical form and is presented to but spaced from axially extending surfaces on the elements 16, **16*a*. The gaps between the member 18 and the elements 16, 16*a*** should be as small as possible.

When the windings 15 are energised, the ribs 14, **14*a* assume opposite magnetic polarity and magnetic flux flows from the rib 14*a* across the axial gap between the surfaces of the rib 14*a* and the element 16*a*, across the radial gap between the element 16*a* and the third member 18, along the third member, across the radial gap between the third member 18 and the element 16 and across the axial gap between the element 16 and the rib 14. An axial force is therefore developed which is transmitted through the elements, to the plate 17. If the force restraining the plate 17 is small there will be substantially no deflection of the individual elements 16 and 16*a*. If however the force restraining the plate 17 is substantial then a progressive deformation of the helical elements 16 and 16*a* will occur with the gaps between the ribs and elements at the free ends of the latter, closing first. The force applied to the plate 17 will therefore progressively increase until the restraining force is overcome. There is therefore a progressive increase in the force which is applied to the plate 17. Thus, for a device constructed as described, there will be available at the plate 17 a force tending to move the plate which is greater than that of a device of the same size in which the elements 16 and 16*a*** are rigidly connected to each other throughout their axial length.

In the construction shown in FIG. 2, a single helical element 16 is provided and the member 19 is provided with a rib 14 corresponding to the same rib of the example of FIG. 1. The other rib 20 however extends to the member 18 and preferably engages therewith. The operation of the device is the same as described with reference to FIG. 1 except of course that in this case there is only one helical element.

As shown in FIG. 1, the free ends of the elements 16, **16*a* can be connected to an annular member 21**. This is to ensure that the relative spacing of the elements is maintained. This is not possible with the arrangement which is shown in FIG. 2. In both constructions, the helical elements are shown to be of triangular cross-section. A reduction in the weight of the elements can be obtained by recessing the longer side of the section. When reducing the section in this manner it is important to ensure that magnetic saturation of the material forming the elements does not occur when the device is in use.

I claim:

1. An electromagnetic device comprising a first member of annular form, a second member located within said first member and having two or a multiple of two axially spaced helical ribs defined on its surface presented to the first member, windings carried by said second member and which when supplied with electric current causes adjacent ribs to assume opposite magnetic polarity, said first member when the windings are energised, moving axially relative to said second member to reduce the reluctance of magnetic circuits defined by the two members, characterised by a third member of annular form surrounding said first member, said third member being formed from magnetic material and defining a cylindrical surface presented to said first member, said first member comprising a helical element having an outer face presented to but spaced from the cylindrical surface of said third member and a face presented to a face of a rib of the second member, said helical element having the characteristic of a coiled spring, whereby when the windings are energised, deformation of the helical element can take place, thereby progressively increasing the force available at one end of the member.

2. A device according to claim 1 including a plate mounting said element and located at said one end of the member, said plate constituting the output member of the device.

3. A device according to claim 1 or claim 2 in which said one member includes a further element or elements, the total number of elements being equal to the number of ribs on said second member.

4. A device according to claim 3 including means connecting the free ends of said elements.

5. A device according to claim 1 in which one of said ribs extends into contact with the internal surfaces of said third member.

6. A device according to claim 1 in which said element has a generally triangular cross-section.

* * * * *